Nov. 14, 1933.                P. M. FROMAGET                1,934,850
               CLUTCH DEVICE WITH A HYDRAULIC SERVOMOTOR
                          Filed Nov. 1, 1929
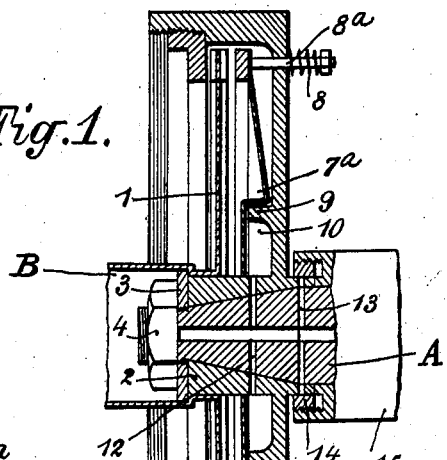
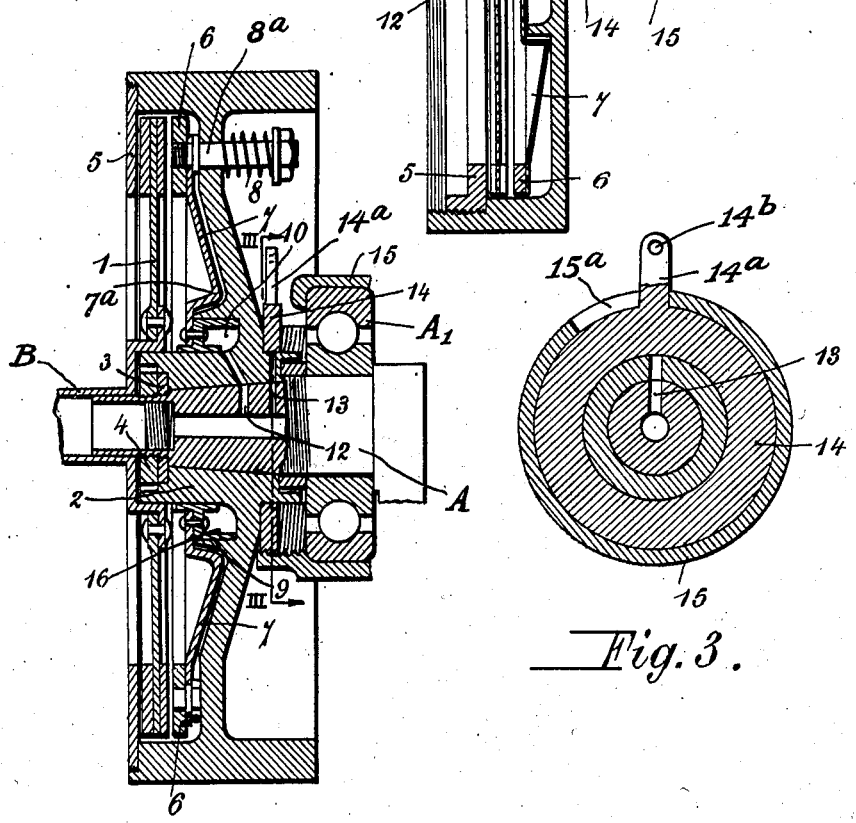
INVENTOR
PIERRE MARIE FROMAGET
BY
         ATTORNEYS

UNITED STATES PATENT OFFICE 1,934,850

CLUTCH DEVICE WITH A HYDRAULIC SERVOMOTOR

Pierre Marie Fromaget, Toulon, France

Application November 1, 1929, Serial No. 403,937, and in Luxemburg, November 8, 1928

3 Claims. (Cl. 192—85)

In current practice it is necessary to use a certain amount of energy to positively control the clutches of mechanical power transmission devices in order to overcome the tension of the elastic parts which provide for the adhesion between the coupling surfaces.

The present invention relates to a clutch device wherein such drawbacks are obviated. According to this invention, the clutch is operated by means of a servomotor utilizing a liquid under pressure to transmit the required energy. To this end, the movable part of the clutch is controlled by the action of a servomotor similar to that of a hydraulic press, and is supplied with lubricating oil from the engine. The oil chamber may be made fluidtight (except for leakage) for the clutching action, or it may be connected with adjustable discharge outlets to control the release of the clutch.

In the accompanying drawing:

Fig. 1 is a diagrammatic view showing the application of the device, according to this invention, to a clutch having a single disc.

Figs. 2 and 3 are vertical and transverse sections, respectively, of a modification of the clutch shown in Fig. 1, Fig. 3 being a section along the line III—III of Fig. 2.

In Fig. 1, a driving shaft A carries a flywheel 2 firmly connected therewith and also with a ring 5. The internal surface of this ring is used as one of the coupling surfaces. The driven shaft B carries a disc 1, which is somewhat elastic and in its normal position remains at a certain distance from the ring 5. The disc 1 freely rotates on the hub of the flywheel 2 and is supported thereon by means of a washer 3 and a nut 4. Another disc 7 is mounted on the hub of said flywheel, but can slide in the direction of the horizontal axis. A ring 6 is mounted on the disc 7 and is pressed by means of springs 8 against the web of the flywheel 2.

The springs 8 are carried by bolts 8ª used also to connect the disc 7 with the flywheel 2. The disc 7 is provided with a circular flange 7ª situated near the middle of said disc and surrounding a rib 9 of the flywheel 2. The flange 7ª and the rib 9 form a compression chamber 10 filled with oil led under pressure through radial channels 12 connected with an axial passage within the shaft A. Some space is left between the flange 7ª and the rib 9, so that oil can escape at the periphery of the chamber 10. Other radial ducts 13 are situated outside of the chamber 10 and may be closed by means of a ring 14 threaded within a casing 15. It is preferred to use a screw thread having a large pitch for this purpose to enable the ring 14 to easily cover and uncover the openings of the ducts 13, as shown in the drawing.

The space between the flange 7ª and the rib 9 is small enough to permit the oil passing through the channels 12 on its way to the chamber 10 to fill in this chamber completely, provided that the ducts 13 are closed. Then the pressure produced in the chamber 10 is sufficient to throw in the clutch.

The ducts 13 are sufficiently large to take care of the discharge of the entire oil coming from the motor, so that the oil cannot penetrate into the channels 12 leading to the chamber 10 when the ducts 13 are open. The oil remaining in the chamber 10 leaves through the space between the flange 7ª and the rib 9, and the clutch is released by means of springs 8.

The operation is as follows:—

To throw on the clutch, the operator turns the ring 14, by any suitable means, thus closing off the ducts 13. The oil flowing through the ducts 12 produces pressure in the chamber 10, thus separating the disc 7 from the flywheel 2 and pressing the ring 6 against the periphery of the disc 1 until it engages the ring 5.

The gradual switching-on of the clutch depends upon the amount of resistance offffered by the ducts 12 to the circulation of the oil, the amount of leakage and also upon the amount of oil pressure. However, up to a certain speed of the engine, this pressure is determined by the rate of speed of the engine. After that speed has been reached, the engine will only take the load it can carry during acceleration, as a decrease in speed would reduce the pressure and thus release the clutch. Owing to this arrangement, a very gradual coupling action is attained without any attention from the driver.

On the other hand, the coupling effect remains very powerful and there is no lagging after the machine has passed the stage wherein the pressure causes the discharge of the oil pump, owing to the dimensions of the chamber 10.

To throw off the clutch, the orifices 13 are opened and the small amount of oil supplied to the chamber 10 is expelled by the centrifugal force through the space between the elements 7 and 9. The oil which, owing to this leakage, reaches the casing of the clutch, is circulated by the flywheel.

This apparatus is easy to manufacture as there are no abutments and the device is very compact. The socket of disc 1 can drive the power-shaft of the gear box centered on the crankshaft directly without requiring a ball-bearing; the friction surfaces of the disc come into contact with the rim of the flywheel and do not permit the passage of any clutching springs. They may carry at least 0.5 kg. per cm² although operating in oil, and are, therefore, not damaged during the lagging which takes place when the engine takes on a load.

No upkeep or adjustment is required until the friction facing is worn out.

This device does not require any muscular force and no adjustments are necessary. The speed can readily be changed owing to the small inertia. Another feature is that the failure of the working of the clutch indicates that the oil pump of the engine has stopped.

In the modification shown in Figures 2 and 3, the disc 7 is secured to the face of a piston 16 having a U section, the flanges of the U are slidable on the corresponding cylindrical parts of the flywheel 2 and its rib 9, said parts thus forming an annular body, similar to that of a hydraulic press.

The feeding ring 14 which controls the outlet openings 13, is threaded within a casing 15 surrounding a bearing $A_1$ of the driving shaft A. The ring 14 is provided with an abutment $14^a$ projecting beyond the casing 15 and movable within an opening $15^a$ provided in said casing. The abutment $14^a$ has a hole $14^b$ used for holding means connecting this abutment with a regulating device.

I claim:

1. Clutch device with a servomotor actuated by a lubricant, comprising in combination, a driving shaft, a flywheel connected with said driving shaft, a ring connected with said flywheel and provided with a coupling surface, a driven shaft, a disc connected with said driven shaft, another disc rotated by said driving shaft and adapted to move in the direction of the axis of said driving shaft, springs separating the second-mentioned disc from the first-mentioned disc, a circular flange on said flywheel, another flange on the second-mentioned disc, said flanges forming a chamber adapted to be filled with a lubricant and provided with an outlet for said lubricant, a bearing for said driving shaft, said driving shaft being provided with an inlet communicating with said chamber, the diameter of said outlet being smaller than the diameter of said inlet, and a ring threaded within said bearing and adapted to regulate the passage of said lubricant to said chamber.

2. Clutch device with a servomotor actuated by a lubricant, comprising in combination, a driving shaft, a flywheel connected with said driving shaft, a ring connected with said flywheel and provided with a coupling surface, a driven shaft, a disc connected with said driven shaft, another disc rotated by said driving shaft and adapted to move in the direction of the axis of said driving shaft, springs separating the second-mentioned disc from the first-mentioned disc, a circular flange on said flywheel, another flange on the second-mentioned disc, said flanges forming a chamber adapted to be filled with a lubricant and provided with outlets for said lubricant, a bearing for said driving shaft, and a ring threaded within said bearing and adapted to regulate the passage of said lubricant to said chamber.

3. Clutch device with a servomotor actuated by a lubricant, comprising a driving shaft, a flywheel connected with said driving shaft, a ring connected with said flywheel and provided with a coupling surface, a driven shaft, a disc connected with said driven shaft, another disc rotated by said driving shaft and adapted to move in the direction of the axis of said driving shaft, springs separating the second-mentioned disc from the first-mentioned disc, a circular flange on said flywheel, a piston connected with the second-mentioned disc, a wall of said piston and said flange forming a chamber adapted to be filled with a lubricant, a bearing for said driving shaft, said driving shaft having an inlet communicating with said chamber, and a ring threaded within said bearing and adapted to regulate the passage of said lubricant to said chamber.

PIERRE MARIE FROMAGET.